April 16, 1968     H. CORBETT     3,377,661

PRECOMPRESSION ATTACHMENT

Filed Oct. 6, 1964     3 Sheets-Sheet 1

INVENTOR.
Harold Corbett

INVENTOR.
Harold Corbett

April 16, 1968     H. CORBETT     3,377,661

PRECOMPRESSION ATTACHMENT

Filed Oct. 6, 1964     3 Sheets-Sheet 3

INVENTOR.
Harold Corbett
BY J.S. Michelman
Att.

United States Patent Office 3,377,661
Patented Apr. 16, 1968

3,377,661
PRECOMPRESSION ATTACHMENT
Harold Corbett, Longmeadow, Mass., assignor to
David Ratner, East Longmeadow, Mass.
Filed Oct. 6, 1964, Ser. No. 401,833
7 Claims. (Cl. 18—30)

This invention is concerned with a precompression technique for speeding up molding time in conventional plastic injection type molding machines.

In the conventional molding operation of the plastic injection molding machines granular plastic is fed into a heat chamber. The injection forcing means is out of contact with the granular plastic until such time that the plastic material has been sufficiently heated. At that particular moment, the forcing means then pushes the heated granular plastic, which is now somewhat in a molten state, into the cavity of the mold. This method is time consuming, requires intensity of heat, lowers production and limits the type of products that can be molded in plastics.

It is a primary object of this invention to provide a means for controlling the flow of plastic material between the plastisizing device and the mold.

It is still another object of the within invention to provide a means in the plastisizing device for increasing the speed with which the change of state of the plastic material may be made.

It is still a further object of the within invention to provide a means in the plastisizing device for enabling the plastic material to be placed under high pressure.

It is yet a further object of the within invention to provide a plastisizing technique that will speed up and increase the cycle of operation of an injection type molding machine.

It is still an additional object of the within invention to provide a device that may be attached to an existing injection molding machine which will increase the operation cycle, reduce the heat requirement, and provide increased pressure so that new and special types of products may be molded from plastic that heretofore were not feasible for this type of molding.

It is still an important object of the within invention to provide a plastisizing device for an injection type molding machine which will produce a denser product so that thinner sections may be molded.

These and many other objects are obtained by the use of a shut-off valve located between the mold and the heat chamber. The nozzle is controlled by an electronic control system. The nozzle shuts off upon the completion of the injection of plastic into the mold cavity. Once the forcing means has returned to normal position, it does not wait but as soon as the granular plastic fills the heating cylinder the forcing means immediately pushes the plastic material into the heating chamber against the shut-off valve. The pressure of the forcing means against the plastic in the plastisizing heating chamber will force the plastic material against the closed shut-off valve and thereby create an increase in pressure. The increased pressure will require less heat for melting the plastic material, and will combine to produce a more dense plastic material for use with thinner molding requirements.

The novel feature of the invention will be more readily understood from the following description which should be taken together with the accompanying drawings in which a particular embodiment of the invention is disclosed and in which the separate elements and parts are designated by suitable reference characters in each of the views and in which.

Figure 1:
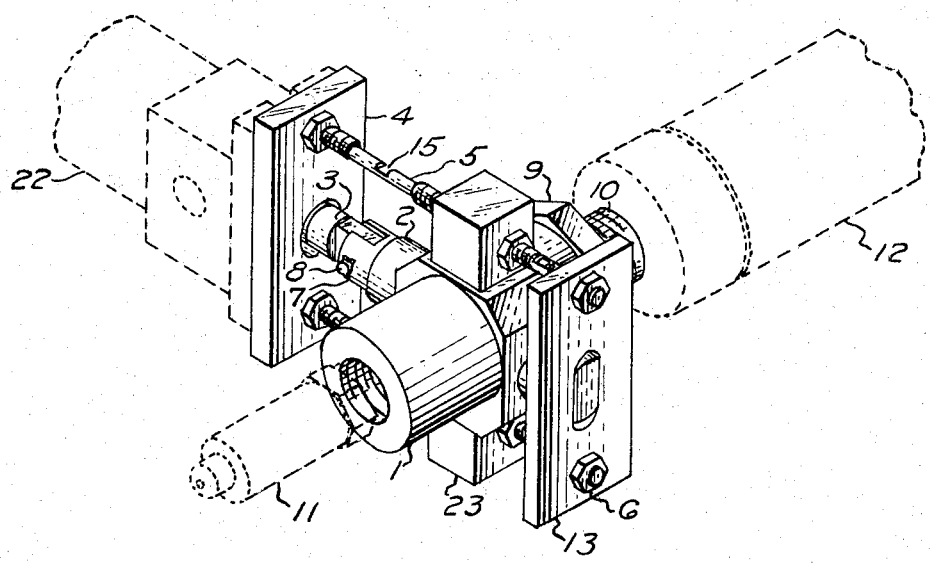
FIGURE 1 is a perspective view of the area at the end of the heating cylinder showing wherein the cylinder of this invention is interconnected.

In order to comprehend this invention one must be familiar with injection type molding machines. In the conventional injection type molding machine, the conventional molding nozzle is threaded into position at the end of the plastic heating cylinder 12. Since it is the purpose of this invention to place an adapting part in between these two portions of the injection molding machine, a main valve body 1 as shown in FIGURE 1 has threads proximate the conventional molding nozzle 11 for engaging the conventional molding nozzle 11. Similarly, on the opposite end of the main valve body of the invention is the main body mounting threads 10 which are adapted to engage within the threads of the plastic heating cylinder 12. The valve sealing land 14 is located between the threads 10 and the heating cylinder 12. The main valve body 1 has a ported valve spool 2 which is inserted therein. Within the ported valve spool 2 is an opening 20. When the ported valve spool 2 is in a retracted position, the opening 20 aligns with the main valve bore 21 within the main valve body 1 which is also aligned with the nozzle bore 17 and the bore within the heating cylinder 19. This is clearly shown in the cross-section view of FIGURE 5.

Figure 6:
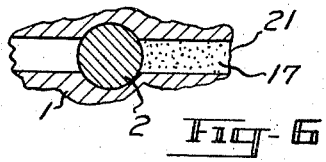
FIGURE 6 is a section view of the ported valve spool blocking the main valve bore when in closed position.

When the ported valve spool 2 is in an extended position as shown in FIGURE 6, the opening 20 is not in alignment with the bore 21 and consequently no plastic material may pass from the main valve bore 21 into the nozzle bore 17.

As stated, the conventional molding nozzle 11 consists of a conventional nozzle bore 17 and a nozzle opening 16. At the opposite end from 16 are the nozzle securing threads 18 which engage with complementary threads 18 in the main valve body 1. In this particular embodiment, the heating cylinder has two separate channels located on each side of 19 for the purpose of spreading the plastic material for the facilitating the heating of it. The heating cylinder 12, as already stated, is connected by threads 10, which engage the main valve body 1. The valve assembly has been so designed as to enable adjustments to be made so as to be easily mounted and controlled by a hydraulic system (see FIGURE 3).

There is a conventional type of hydraulic operating cylinder for the spool at 22 which is in dotted lines in FIGURE 1. This is, of course, not part of the invention. The spool and hydraulic cylinder support plate 4 is connected to the spool operating hydraulic cylinder 22. Mounted within an opening in the spool cylinder actuating support plate is the spool actuating piston rod 3. Spool actuating piston rod 3 is connected to the ported valve spool 2 by the spool connecting pin 8 which is inserted within the spool connecting pin securing device 7. This is actually a collar with an opening therein and a pin inserted through the collar so that there is permanent connection between the piston rod 3 and the ported valve spool 2. (This is a conventional type of connecting means.)

Figure 7:
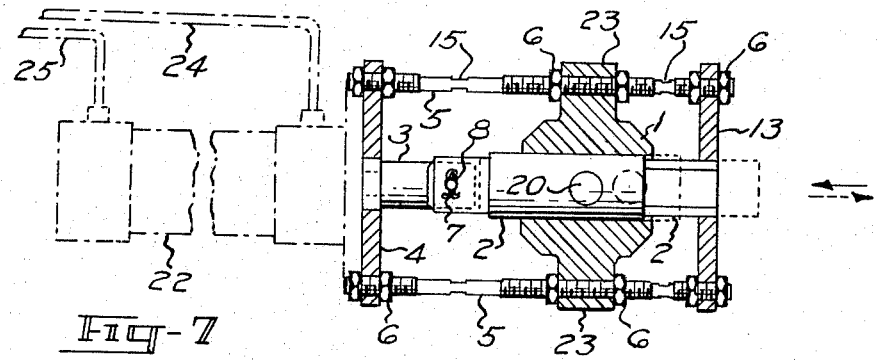
FIGURE 7 is a cross-section view of the assembly shown in FIGURE 4 taken along line 7—7.

Within a bore in the main valve body 1 the ported valve spool 2 is located. In order to control the stroke of the spool cylinder actuating piston rod 3 and 2 obviously, there are various studs and supporting devices. This can be seen both in view of FIGURE 1 and in view of FIGURE 7 most clearly. The supporting studs for the actuating hydraulic cylinder 22 connect the spool cylinder actuating support plate 4 with the stud mounting lugs 23 and with the valve spool port alignment plate 13. There are two sets of these supporting studs 5. There are adjusting and locking nuts 6 located proximate each of the plates 4 and 13. There are threads near each of the nuts 6. There is a wrench flat for adjusting the studs at 15. It is obvious from the view of FIGURE 7 that by bringing the main body 1 closer to the plate 4, the stroke of rod 3 will be shorter; while bringing the main valve body 1 closer to the plate 4, the stroke of rod 3 will be shorter; while bringing the main valve body 1 closer to the valve spool port alignment plate 13, the stroke of 3 will be longer. It is important to keep in mind that the stroke of the piston rod 3 in conjunction with the spool valve 2 must be exact so that the opening 20 in the spool valve 2 will line up with the bore 21 in the main valve body 1 as well as the openings in the cylinder 19 and the nozzle bore 17 as already mentioned. (See FIGURE 5.)

It is also, of course, important that the main valve body 1 be tightly connected to the plastic heating cylinder 12. The main valve body 1 has a main body wrench tightening land 9 for securing the main valve body 1 securely with the plastic heating cylinder 12.

Figures 2, 3:
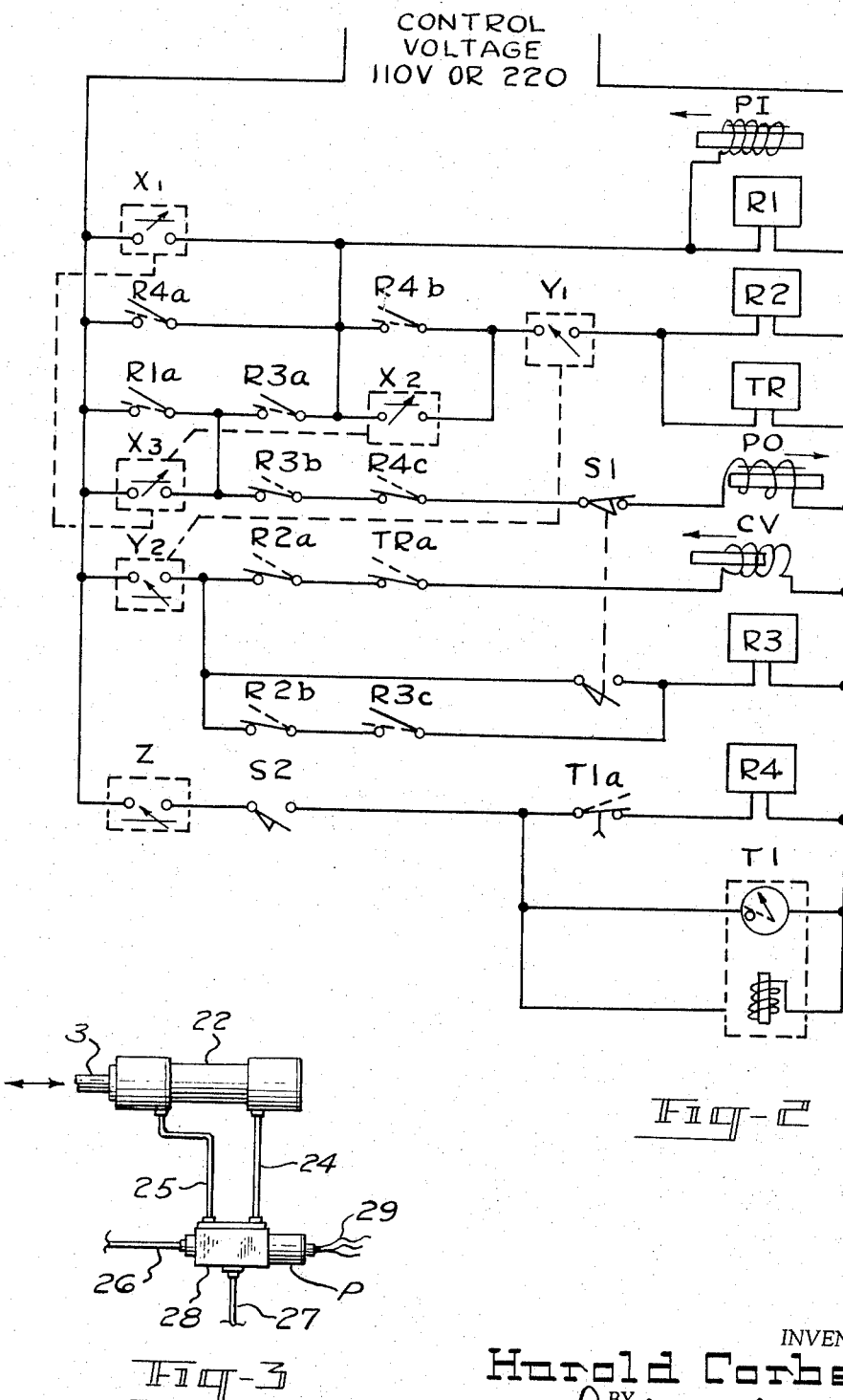
FIGURE 2 is a schematic view of the electronic control circuit for operating the valve of this invention.
FIGURE 3 is a schematic view of the hydraulic system for operating the valve of this invention.
Figure 4:
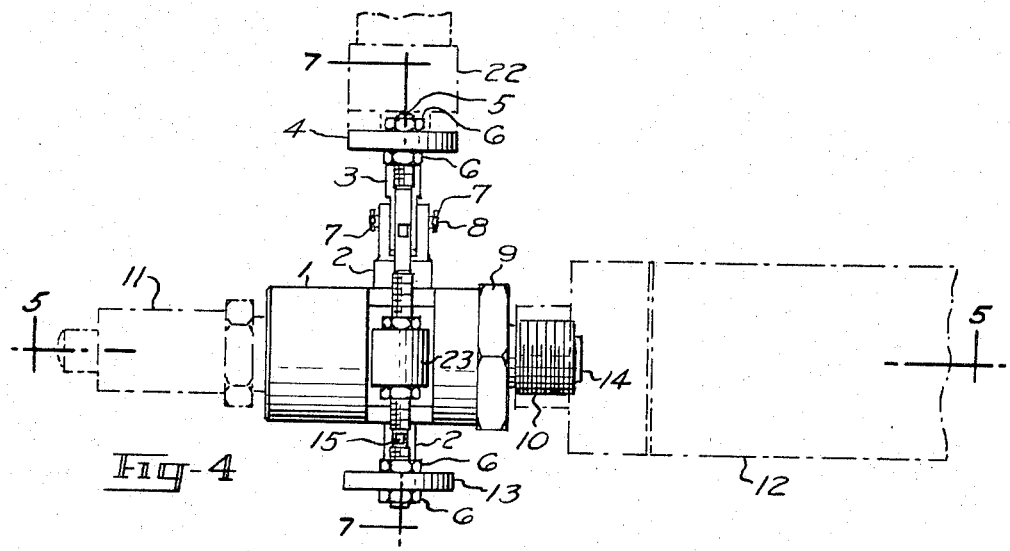
FIGURE 4 is a top elevational view of the view of FIGURE 1 showing how the valve and its respective components are interconnected between the heat cylinder and the molding nozzle.

In the view of FIGURE 3 there is shown the conventional type of hydraulic lines for operating the spool actuating piston rod 3. The hydraulic cylinder 22 for operating the ported spol valve 2 is connected to a return line 25. There is also a line 24 for the inlet of the hydraulic fluid to the spool operating cylinder valve 28. The line 26 is for the return from the spool actuating cylinder. The line 27 is for the return of the fluid to the hydraulic tank (not shown). Wires 29 are part of the control circuit which is shown in the view of FIGURE 2 and are the wires to operate valve 28.

It is probably by this time apparent that there is a cycle of operation. In the conventional injection type molding machine after the injection of the melted plastic, the forcing means or piston returns to a position allowing material to enter the heat chamber 12 enabling it to become relaxed. Then the forcing means pushes the heat material into the nozzle "and through the nozzle" into the mold which is not shown in the drawings.

Once this is completed the injection ram returns to its normal position to allow once again the plastic material to enter the heat chamber 12. This is what one calls a cycle of operation. In the present invention the cycle is somewhat different. When the forcing means returns to its position to allow the plastic material to enter the heat chamber, the valve or spool actuating piston rod 3 closes the main valve bore 21 as shown in FIGURE 6. At a predetermined time the forcing means pushes the plastic material against the ported valve spool 2 as shown in FIGURE 6 and then the ported valve spool 2 controlled by the spool actuating piston rod returns to a position wherein the opening 20 is in alignment with the main valve bore 21 so that immediately the plastic material is pushed through the opening 20 into the nozzle bore and out the nozzle opening 16 into the mold (not shown). In order for this cycle to operate smoothly and synchronously a control circuit has been conceived. The control circuit is essentially an electromagnetic type of control circuit operated by relays and contacts on relays.

The view of FIGURE 2 shows the control circuit. The control circuit may be operated manually or it may be operated automatically. In the manual operation the operator must set the machine selector switch Z to manual operation. This is located on a control panel (not shown). He sets the plunger "in and out" selector X to the "out" position closing X3 opening X1 and X2. X1, X2 and X3 are ganged together. He then sets the control valve "off-on" selector Y to the "on" position closing contacts Y1 and Y2. Control valve solenoid CV then becomes energized. It is shown as P in FIGURE 3.

The plunger "out' solenoid PO becomes energized causing the forcing means to be actuated. S1 is tripped to full plunger "out" position de-energizing plunger out solenoid PO and energizing the sealing relay R1, also energizing the automatic control relay R3 and the plunger "in" solenoid P1. The forcing means will then advance pushing the plastic material ahead of it until restricted by the closed valve as shown in FIGURE 6. Although restricted, the forcing means of the molding machine remains actuated and therefore is held under pressure against the material which is jammed within the main valve bore 21 as well as in the heating cylinder 12 while blocked by the ported valve spool 2.

The operator then turns the plunger "in and out" selector switch X to "in" position closing the contacts of switches X1, X2 and opening X3 thereby energizing control valve relay R2 as well as timing relay TR. This action also de-energizes control valve solenoid CV causing the ported valve spool 2 to withdraw and having its opening 20 become aligned with the main bore valve 21. Once the opening 20 is aligned with the main valve bore 21, the plastic material shall then become ejected through the system and out the nozzle opening 16. When the complete plastic material has been injected, the operator then turns the plunger selector switch X to the "out" position closing X2 and opening the contacts X1 and X2. This de-energizes the control valve relay R2, the timing relay TR and the plunger "in" solenoid P1, energizing plunger "out" solenoid PO.

The timing relay TR has contacts TR$a$ which are timed out, energizing the control valve solenoid CV and closing the control valve 28. S1, the limit switch, is at the full plunger out position. In order to start the new cycle it is necessary to set S1 for the new manual cycle.

The electrical circuit of FIGURE 2 may be operated automatically. The operator must set the machine selector switch Z to the automatic closing position, set the plunger "in and out" selector switch X to the out position which closes X3 and opens X1 and X2. He then sets the control valve "off-on" selector switch Y to the on position which closes Y1 and Y2. Immediately control valve solenoid CV will energize.

The plunger out solenoid PO energizes causing the forcing means to become actuated. S1 trips at the actuated position of the forcing means, de-energizing the plunger "out" solenoid PO and energizing sealing relay R1, energizing automatic control relay R3 as well as plunger "in" solenoid P1. The forcing means will advance pushing plastic material ahead until restricted by the closed control valve at 2 as shown in FIGURE 6. Similarly, although restricted, the forcing means remains actuated causing the material to be held under pressure in the heating chamber 12. When the mold closes, the mechanism trips the mold close limit switch S2 and energizes control valve relay R2, energizing automatic plunger "in" relay R4 energizing control valve timing relay TR and energizing timer T1. S2 also de-energizes control valve solenoid CV enabling the forcing means to inject the material into the mold at a high rate of speed as (see FIGURE 5) when the opening 20 is in alignment with the bore 21.

The timer T1 times out de-energizing the control relay R2, de-energizing automatic plunger relay R4, de-energizing time delay relay TR and plunger "in" solenoid P1. It energizes plunger "out" solenoid PO causing the plunger or injection ram to go out.

The time delay relay TR contact TR*a*, times out, energizing the control valve solenoid CV and closes the control valve or the spool 2 which is located in the position shown in FIGURE 6.

S1 trips at the full plunger out position de-energizing plunger "out" solenoid PO and energizing the sealing relay R1, energizing the automatic control relay R3, and the plunger "in" solenoid P1. The forcing means will advance pushing the plastic material ahead until restricted by the closed valve. The forcing means remains actuated causing the material to be held under pressure.

The molds open. S2 releases re-setting timer T1. The circuit is now set for a new cycle. With the control valve "off-on" selector switch Y in the off position Y1 and Y2 open the control valve, will not energize, and the forcing means will not be actuated unless called for by the automatic plunger relay R4 or by manual control or operation.

It is to be noted that when the forcing means of the molding machine is applied to the plastic, the timer T1 is initiated or signalled because X1 is tripped physically by a conventional limit switch.

Figure 5:
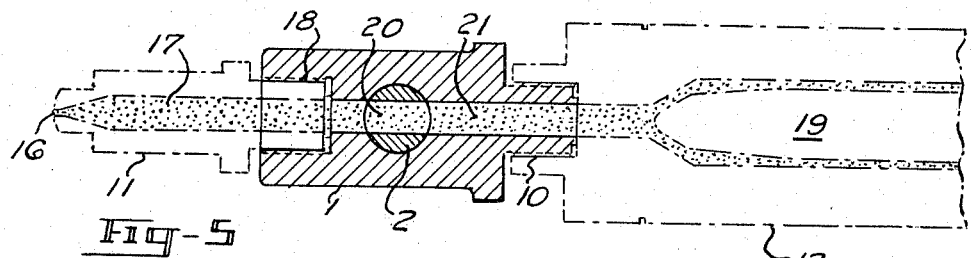
FIGURE 5 is an elevational cross-section view taken along line 5—5 of FIGURE 4.

The control valve may be left on the machine in the "off" position shown in the view of FIGURE 5 and the machine may be operated as normal as if the control valve assembly were not installed.

It is apparent that compressed air may be used instead of hydraulics. Various types of fastening means may be used instead of nuts and bolts and threads. Equivalent valve structure may be employed without departing from the spirit and the scope of this invention.

In consideration of the foregoing disclosure—
I claim:

1. A unitary removable attachment assembly as an accessory for injection type plastic molding machines, said attachment being adapted to be located between a heat cylinder and the nozzle of the molding machine, said attachment comprising a chassis having two separated and connected plates, a main valve body, a ported valve spool horizontally movably mounted within said valve body, said ported valve spool having an opening therein, an opening in said main valve body for interconnection with an opening in said heat cylinder and said nozzle, hydraulic means mounted on one of said plates and connected to said valve spool for operating said spool, for operating in a reciprocating motion said ported valve spool, and means at each end of said main valve body for interconnection with the said heat cylinder and said nozzle, said nozzle being mounted between the said interconnected plates of said chassis.

2. A unitary removable attachment assembly as an accessory for injection type plastic molding machines, said attachment being adapted to be located between a heat cylinder and the nozzle of the molding machine, said attachment comprising a chassis having two separate and connected plates, a main valve body, a ported valve spool movably mounted within said valve body, said ported valve spool having an opening therein, an opening in said main valve body for interconnection with an opening in said heat cylinder and said nozzle, an electronic control circuit, hydraulic means mounted on one of said plates and connected to said valve spool for operating said spool, said ported valve spool being operated by said hydraulic means in a reciprocating horizontal motion under the control of the said electronic control circuit whereby, at predetermined times, its opening is aligned with the opening in the main valve body and the said nozzle, for permitting the flow of plastic material through the said nozzle, said nozzle being mounted between the interconnected plates of said chassis.

3. A unitary removable attachment assembly as an accessory for injection type plastic molding machines, said attachment being adapted to be located between a heat cylinder and the nozzle of the molding machine, said attachment comprising a chassis having two separate and connected plates, a main valve body, a ported valve spool horizontally and movably mounted within said valve body, a hydraulic system, said ported valve spool having an opening therein, an opening in said main valve body for interconnection with an opening in said heat cylinder and said nozzle, an electronic control circuit having time delay relays and solenoids for controlling the operation of said hydraulic system mounted on one of said plates and connected to said valve spool, said ported valve spool being operated in a horizontal reciprocating motion by the hydraulic system and under the control of said electronic control circuit whereby at predetermined times its opening is aligned with the opening in the main valve body and the said nozzle, for permitting the flow of plastic material through the said nozzle.

4. A unitary removable attachment assembly as an accessory for injection type plastic molding machines of the type having a forcing means, said attachment being adapted to be located between a heat cylinder and the nozzle of the molding machine, said attachment comprising a chassis having two separate and connected plates a main valve body, a ported valve spool movably mounted within said valve body said ported valve spool having an opening therein, an opening in said main valve body for interconnection with an opening in said heat cylinder and said nozzle, a hydraulic system mounted on one of said plates, an electronic control circuit, said ported valve spool being operated in a reciprocating motion by the hydraulic system under the control of said electronic control circuit, said molding machine having a forcing means pressure from the said forcing means being restrained by the said valve spool, said electronic control circuit having means for the aligning of the opening of the said ported valve spool with the orifice of the nozzle after the forcing means of the molding machine has exerted pressure for a predetermined time against plastic material located in the heat cylinder whereby the plastic material is permitted to flow from the said heat cylinder through the attachment and through the opening and out the nozzle.

5. A removable attachment assembly as an accessory for injection type plastic molding machines, said attachment being adapted to be located between a heat cylinder and the nozzle of the molding machine, said attachment comprising a chassis having two separate and connected plates a main valve body, a ported valve spool movably mounted within said valve body, said ported valve spool having an opening therein, an opening in said main valve body for interconnection with an opening in said heat cylinder and said nozzle, an electronic control circuit, a hydraulic cylinder mounted on one of said plates, said spool valve operated by a hydraulic cylinder and under control of said electronic control circuit, a spool and support plate, said ported valve spool interconnected with said hydraulic cylinder rod through said support plate, stud means on said support plate having threads for adjusting the position and the distance of the spool operated cylinder from the main valve body whereby the reciprocating movement of the said ported valve spool is controlled.

6. An attachment for an injection type plastic molding machine as described in claim 5 wherein said stud means on said support plate comprise a plurality of substantially cylindrical supporting studs, one stud mounted above said ported valve spool, a second stud mounted below said ported valve spool, said studs interconnecting said spool cylinder support plate and said main valve body, thread means on said studs, wrench flats on said studs for turning said studs, and a valve spool alignment plate on the opposite side of said main valve body from said cylinder support plate, said studs passing through said main valve body and terminating in said valve spool alignment plate.

7. An attachment for injection type plastic molding machine, said attachment being adapted to be located between a heat cylinder and the nozzle of the molding machine, said attachment comprising a main valve body, a ported valve spool movably and horizontally mounted within said valve body, said ported valve spool having an opening therein, an opening in said main valve body for interconnection with an opening in said heat cylinder and said nozzle, means for adjustably mounting said ported valve spool whereby said ported valve spool may be moved closer or further away from the main valve body so that the movement of the said ported valve spool within the main valve body may be adjustably controlled, said means on said support plate comprising a plurality of substantially cylindrical supporting studs, one stud mounted above said ported valve spool, a second stud mounted below said ported valve spool, said studs interconnecting said spool cylinder support plate and said main valve body, thread means on said studs, wrench flats on said studs for turning said studs, and a valve spool alignment plate on the opposite side of said main valve body from said cylinder support plate, said studs passing through said main valve body and terminating in said valve spool alignment plate.

References Cited
UNITED STATES PATENTS

| | | | |
|---|---|---|---|
| 2,423,914 | 7/1947 | Nacker. | |
| 2,671,247 | 3/1954 | Lester | 18—30 |
| 2,675,583 | 4/1954 | Scherry | 18—30 |
| 2,871,517 | 2/1959 | Allard | 18—30 |
| 2,952,041 | 9/1960 | Bernhardt | 18—30 X |
| 2,950,501 | 8/1960 | Harkenrider | 18—30 |
| 3,032,819 | 5/1962 | Gasmire | 18—30 |
| 3,109,199 | 11/1963 | Hardy. | |
| 2,686,934 | 8/1954 | D'Amore. | |
| 3,026,567 | 3/1962 | Scott et al. | 18—30 |
| 3,029,471 | 4/1962 | Adams et al. | 18—30 X |
| 3,050,084 | 8/1962 | Palfey | 18—12 |
| 3,112,523 | 12/1963 | Goulet et al. | 18—30 X |
| 3,172,161 | 3/1965 | Trueblood | 18—30 |
| 3,191,233 | 6/1965 | Linderoth | 18—30 |
| 3,238,568 | 3/1966 | Barnett et al. | 18—30 |

FOREIGN PATENTS 1,271,574  4/1961  France.

WILLIAM J. STEPHENSON, *Primary Examiner.*